(12) United States Patent
Kaneko et al.

(10) Patent No.: US 8,222,557 B2
(45) Date of Patent: Jul. 17, 2012

(54) ELECTRIC DISCHARGE DETECTION METHOD AND ELECTRIC DISCHARGE MACHINING APPARATUS

(75) Inventors: Yuji Kaneko, Yokohama (JP); Takenori Harada, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 552 days.

(21) Appl. No.: 12/532,115

(22) PCT Filed: Mar. 24, 2008

(86) PCT No.: PCT/JP2008/000696
§ 371 (c)(1),
(2), (4) Date: Sep. 18, 2009

(87) PCT Pub. No.: WO2008/129820
PCT Pub. Date: Oct. 30, 2008

(65) Prior Publication Data
US 2010/0090708 A1   Apr. 15, 2010

(30) Foreign Application Priority Data
Mar. 22, 2007   (JP) ................................ 2007-073864

(51) Int. Cl.
*B23H 1/00* (2006.01)
(52) U.S. Cl. ................. 219/69.11; 219/69.13; 219/69.17
(58) Field of Classification Search .................. None
See application file for complete search history.

(56) References Cited

U.S. PATENT DOCUMENTS

| | | | |
|---|---|---|---|
| 3,922,518 A | 11/1975 | Pfau | |
| 5,126,525 A * | 6/1992 | Kaneko et al. | 219/69.13 |
| 5,359,169 A * | 10/1994 | Kaneko | 219/69.18 |
| 5,386,095 A * | 1/1995 | Kaneko et al. | 219/69.18 |
| 5,399,826 A * | 3/1995 | Kaneko et al. | 219/69.13 |
| 5,408,064 A * | 4/1995 | Takahara | 219/69.18 |
| 5,475,297 A * | 12/1995 | Kaneko | 323/282 |
| 5,534,675 A * | 7/1996 | Kaneko et al. | 219/69.13 |
| 5,869,797 A * | 2/1999 | Goto et al. | 219/69.13 |

FOREIGN PATENT DOCUMENTS

| | | |
|---|---|---|
| EP | 0 671 235 B1 | 5/1998 |
| JP | 46-24678 | 7/1971 |
| JP | 7-24637 | 1/1995 |
| JP | 2001-38527 | 2/2001 |
| JP | 2001-321940 | 11/2001 |
| JP | 3582370 | 10/2004 |

* cited by examiner

*Primary Examiner* — David E Graybill
(74) *Attorney, Agent, or Firm* — McDermott Will & Emery LLP (57) ABSTRACT

An electric discharge machining apparatus having a gate signal generator for generating a gate signal, a power source for applying a voltage across a work gap formed between a tool electrode and a workpiece, a gap voltage detector for detecting a gap voltage of the work gap, an electric discharge detector for supplying an electric discharge detection signal representing electric discharge to the gate signal generator. The electric discharge detector includes a counter for generating a sample clock having a frequency greater than the frequency of the gate signal, and a comparator for receiving the gap voltage and determining that a fall in the gap voltage is larger than a specified voltage difference in each sample clock. The electric discharge detection signal is generated in response to an output signal of the comparator.

8 Claims, 8 Drawing Sheets

ELECTRIC DISCHARGE DETECTION METHOD AND ELECTRIC DISCHARGE MACHINING APPARATUS

FIELD

The present invention relates to an electric discharge machining apparatus for machining a workpiece by generating electric discharge in a work gap. In particular, the present invention relates to an electric discharge detection method for electrically detecting electric discharge occurring in a work gap.

BACKGROUND

In an electric discharge machining apparatus, voltage pulses are repeatedly applied to a work gap formed between a tool electrode and a workpiece. The work gap is generally filled with dielectric fluid, and has a size of a few μm to a few tens of μm. Electric discharge or sparking is caused in the work gap as a result of the application of voltage pulses, and the electric discharge machining apparatus normally detects the electric discharge electrically. Patent documents 1-5 disclose an electric discharge machining apparatus provided with an electric discharge detector or electric discharge detection circuit.

A period from application of voltage pulses to the occurrence of electric discharge is called delay time. The delay time has an undefined value, including zero. Together with the occurrence of electric discharge, current starts to flow via the work gap. Once a specified period ("on-time") elapses from the occurrence of electric discharge, supply of current is stopped. Once a specified period ("off-time") elapses from completion of the on-time, a voltage pulse is again applied to the work gap. On-time and off-time are important parameters controlled by an NC device of an electric discharge machining apparatus. A term "NC" may refer to numerical control or numerically controlled.

Figure 4:
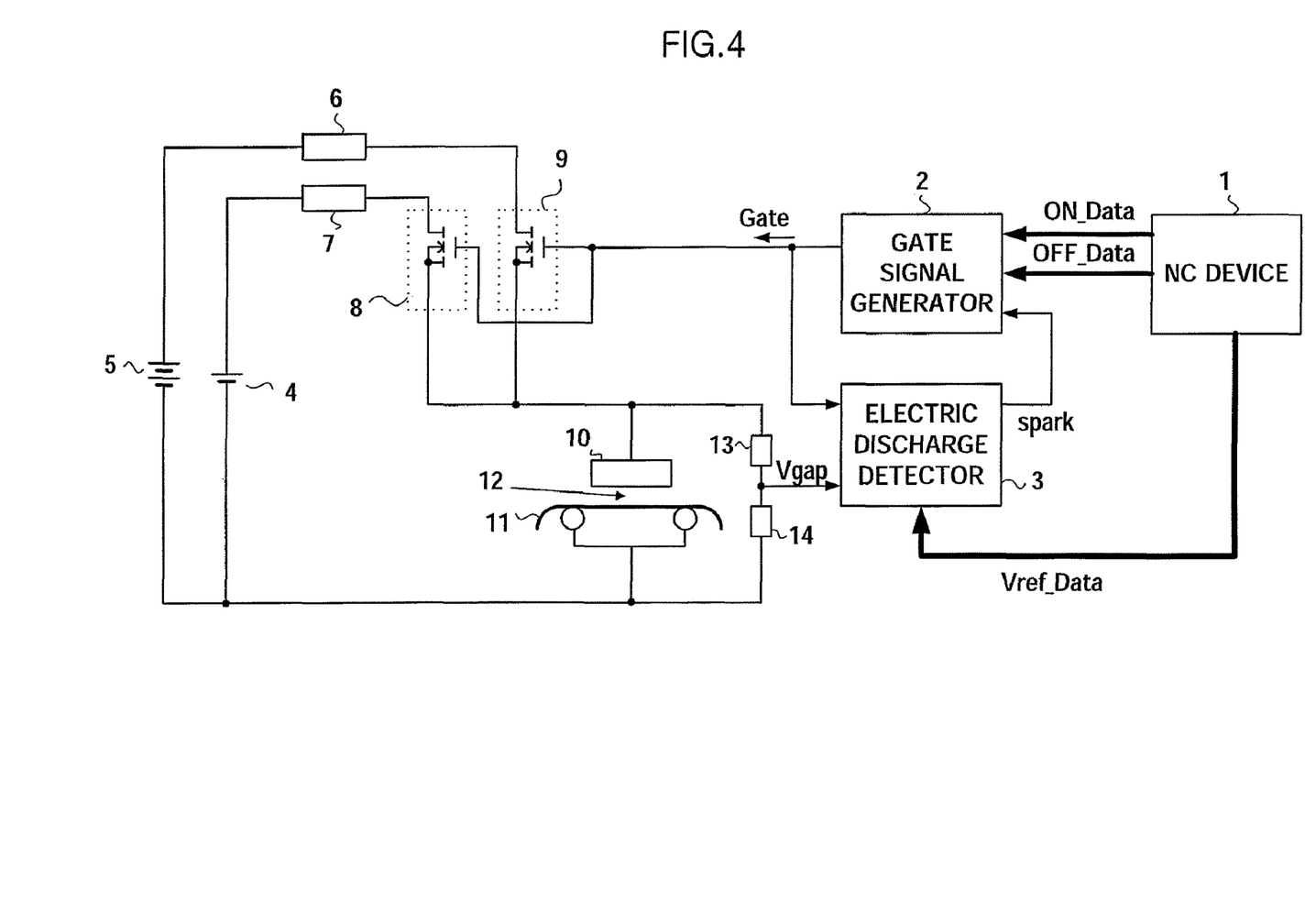
FIG. 4 is a block diagram showing a conventional electric discharge machining apparatus.

A conventional electric discharge machining apparatus provided with an electric discharge detector will be described with reference to FIGS. 4-8. As shown in FIG. 4, a microscopic work gap 12 is formed between a tool electrode 11 and a workpiece 10. A first series combination comprising a dc power source 4, current limiting resistor 7 and switching element 8 is connected to the work gap 12. The voltage of the dc power source 4 is set between 60V and 150V. A second series combination comprising a dc power source 5, current limiting resistor 6 and switching element 9 is connected to the work gap 12, in parallel with the first series combination. The voltage of the dc power source 5 is set between 90V and 280V. A potential divider having a pair of resistors 13, 14 detects a voltage Vgap across the work gap 12. The gap voltage Vgap is supplied to an electric discharge detector 3.

The ON/OFF switching operation of switching elements 8 and 9 is controlled by a gate signal Gate. A gate signal generator 2 generates the gate signal Gate, and the gate signal Gate is also supplied to the electric discharge detector 3. Data ON_Data for on time command and data OFF_data for off time command are generated within an NC device 1 and supplied to the gate signal generator 2. The NC device 1 also supplies data Vref_Data, representing a reference voltage, to the electric discharge detector 3. The electric discharge detector 3 supplies an electric discharge detection signal spark, representing electric discharge, to the gate signal generator 2.

Figure 5:
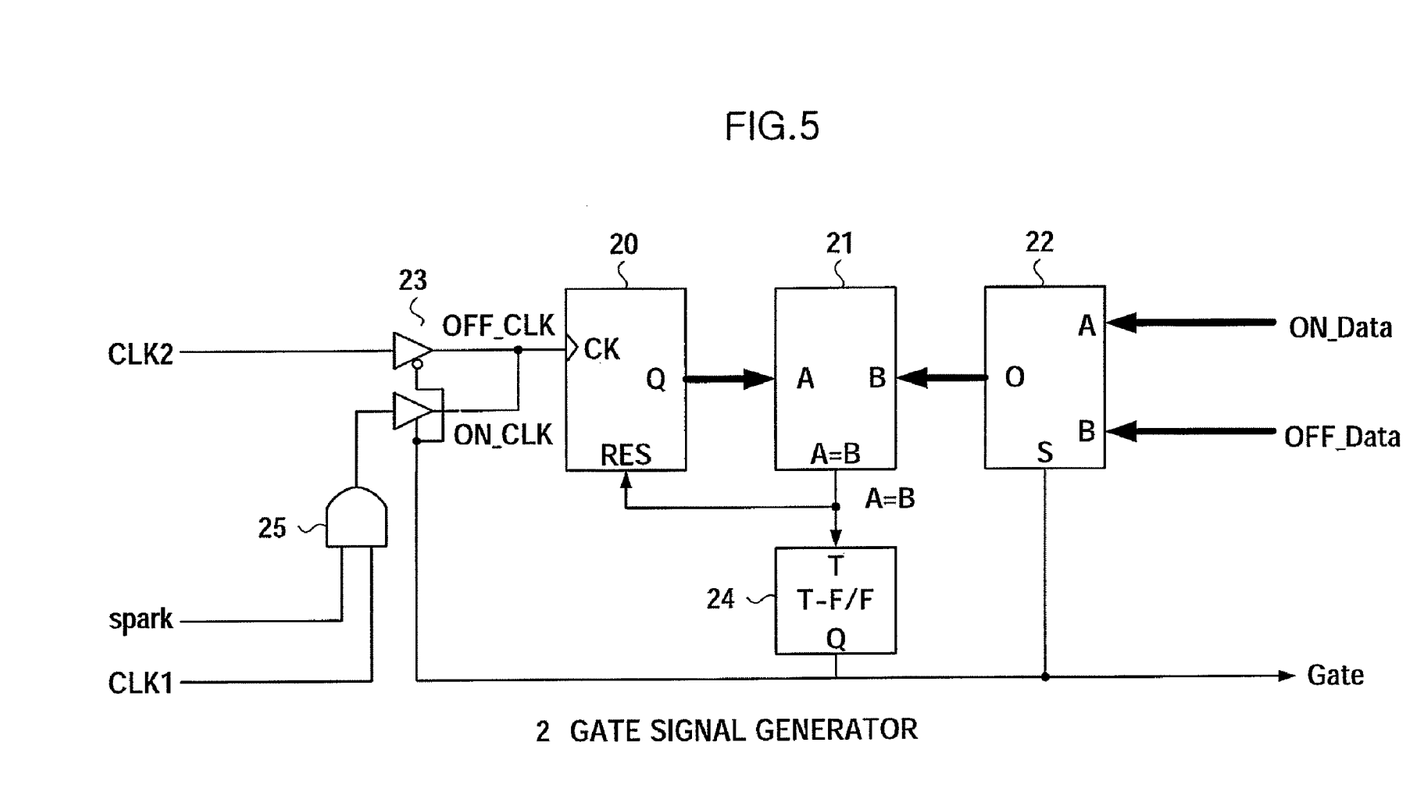
FIG. 5 is a block diagram showing a gate signal generator of FIG. 4.

One example of a gate signal generator will be described with reference to FIG. 5. A gate signal generator 2 is comprised of a selector 23, AND gate 25, counter 20, comparator 21, selector 22 and T-flipflop 24. A clock signal CLK1 is sent to the selector 23 via the AND gate 25. The AND gate 25 only passes the clock signal CLK 1 when the signal spark is on. Also, a clock signal CLK2 is sent to the selector 23. The selector 23 alternately supplies clock signal CLK1 as signal ON_CLK or clock signal CLK2 as signal OFF_CLK to the counter 20. The counter 20 counts the signal ON_CLK or the signal OFF_CLK. A Q output of the counter 20 is connected to an input A of the comparator 21. On time command data ON_Data and off time command data OFF_Data are supplied to the selector 22. An 0 output of the selector 22 is connected to an input B of the comparator 21. Output A=B of the comparator 21 is connected to the reset input RES of the counter 20 and the input T of the T-flipflop 24. The T-flipflop 24 generates the signal Gate for the switching elements 8 and 9. The signal Gate is also supplied to the input S of the selector 22 and to the selector 23.

An operation of the gate signal generator 2 will be described with reference to FIG. 6. If the on time command data ON_Data is set to "6", and the off time command data OFF_Data is set to "4", then: at time t1, if a count of the signal OFF_CLK reaches "4" in the counter 20, then the comparator 21 generates pulse A=B, as shown in FIG. 6(A). As a result of the pulse A=B the count of "4" in the counter 20 is reset to "0", and as shown in FIG. 6(B) the T-flipflop 24 changes the level of the signal Gate from "0" to "1". In response to the signal Gate at level "1", the voltages of the dc power sources 4 and 5 are applied to the work gap 12. Further, the selector 23 selects the signal ON_CLK, while the selector 22 selects the on time command data ON_Data.

Figure 6:
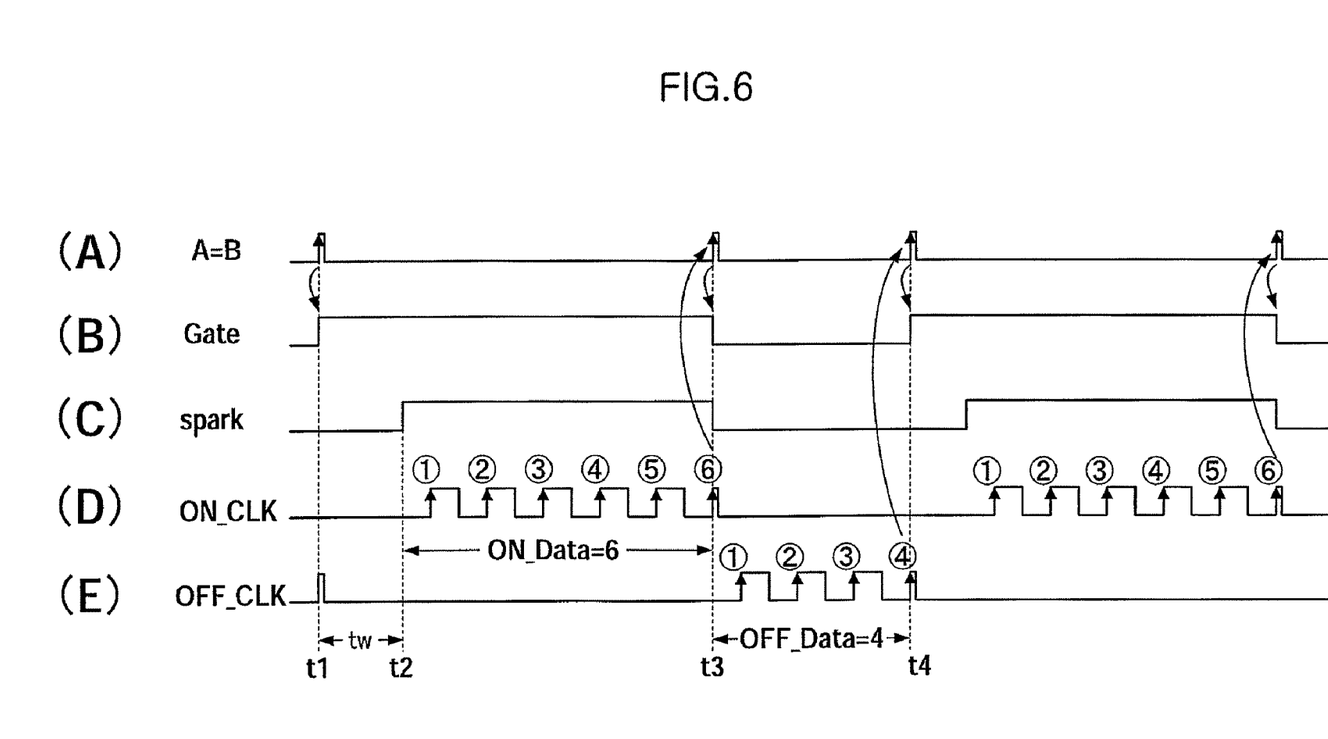
FIG. 6 is a timing chart showing an operation of the gate signal generator of FIG. 5.

At time t2 when an undefined delay time tw has elapsed from time t1, the electric discharge detection signal spark becomes on, as shown in FIG. 6(C). As shown in FIG. 6(D), the counter 20 starts a count of the signal ON_CLK. At time t3, if a count of the signal ON_CLK reaches "6" in the counter 20, then the comparator 21 generates pulse A=B, as shown in FIG. 6(A). As a result of the pulse A=B the count of "6" in the counter 20 is reset to "0", and as shown in FIG. 6(B) the T-flip-flop 24 changes the level of the signal Gate from "1" to "0". In response to the signal Gate at level "0", the switching elements 8 and 9 are turned off and application of voltage to the work gap 12 is stopped. Further, the selector 23 selects the signal OFF_CLK, while the selector 22 selects the off time command data OFF_Data. As shown in FIG. 6(E), the counter 20 starts a count of the signal OFF_CLK. At time t4, if a count of the signal OFF_CLK again reaches "4" in the counter 20, then the comparator 21 generates pulse A=B, as shown in FIG. 6(A).

Figure 7:
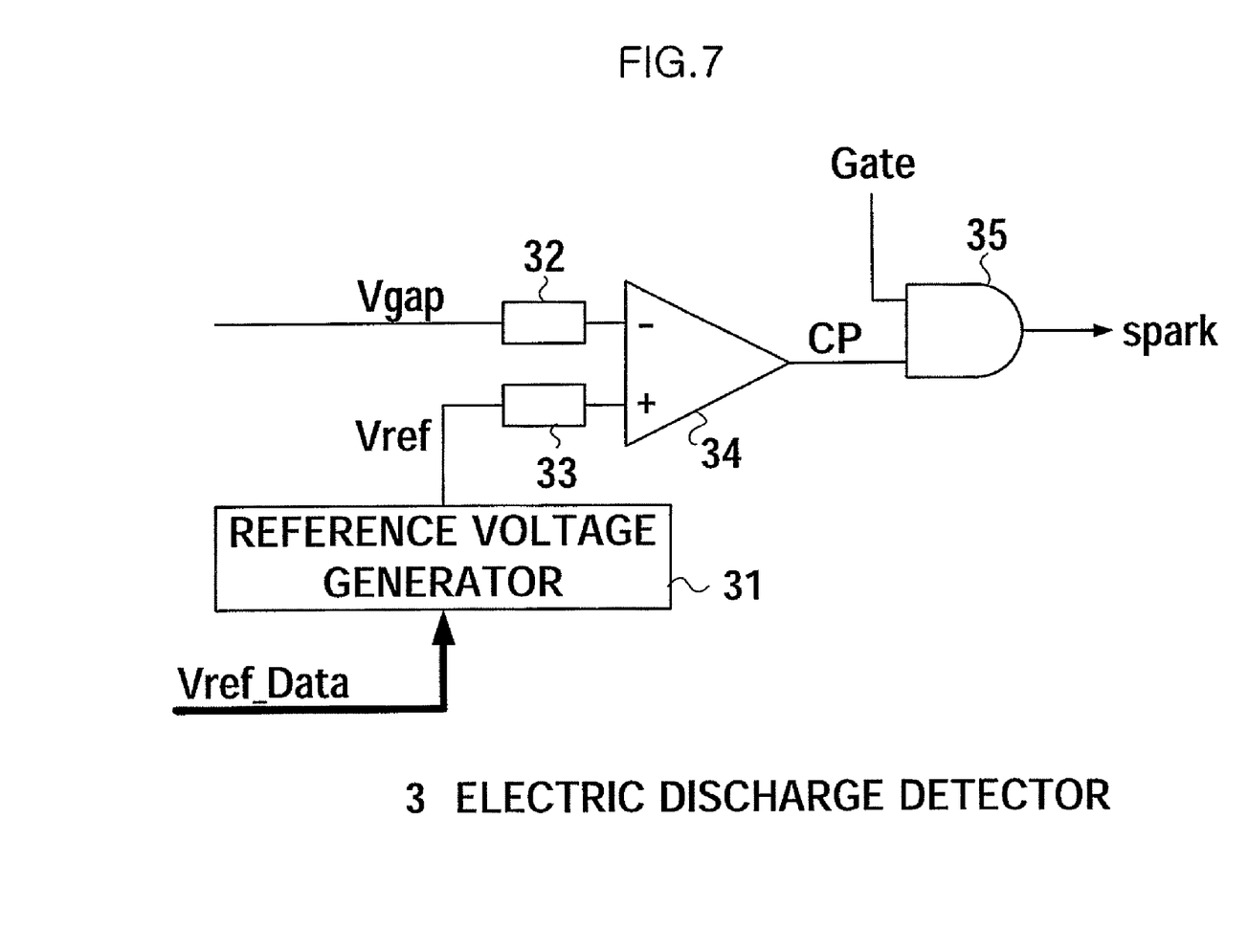
FIG. 7 is a block diagram showing an electric discharge detector of FIG. 4.

One example of an electric discharge detector will be described with reference to FIG. 7. An electric discharge detector 3 is comprised of a reference voltage generator 31, a comparator amplifier circuit 34, and an AND gate 35. The NC device 1 supplies data Vref_Data representing a reference voltage to the reference voltage generator 31. The data Vref_Data is determined according to setting of conditions such as voltage of the dc power sources 4 and 5. The reference voltage generator 31 generates a reference voltage Vref according to the data Vref_Data. A gap voltage Vgap is supplied via a protection resistor 32 to one terminal of the comparator amplifier circuit 34. The reference Vref is supplied via a protection resistor 33 to the other terminal of the comparator amplifier circuit 34. The comparator amplifier circuit 34 compares the gap voltage Vgap and the reference voltage Vref, and generates a binary signal CP. The signal CP is on when the gap voltage Vgap is lower than the reference signal Vref. When the signals Gate and CP are on, the signal spark, which is the output of the AND gate 35, is on.

Figure 8:
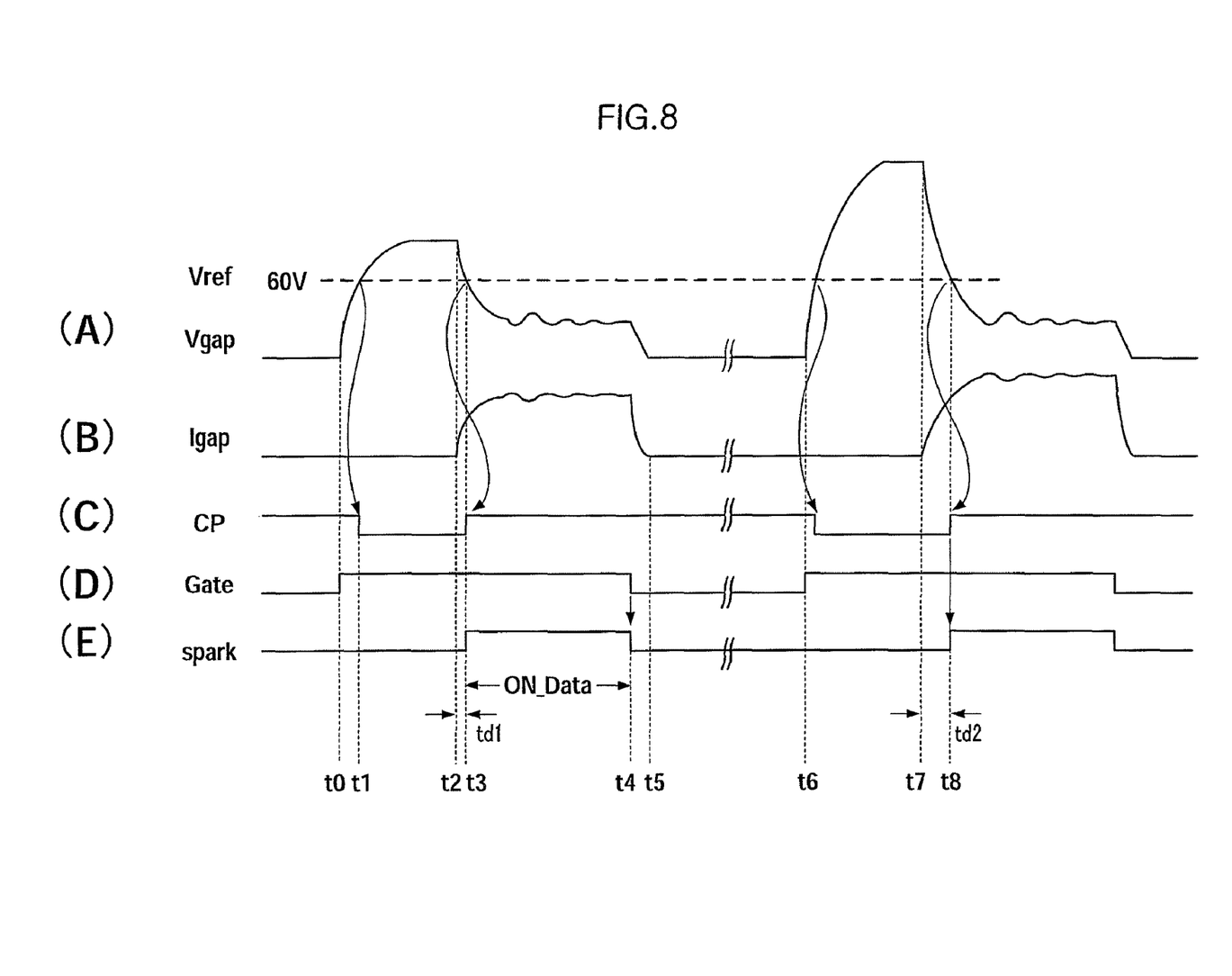
FIG. 8 is a timing chart showing an operation of the electric discharge detector of FIG. 7.

An operation of the electric discharge detector 3 will be described with reference to FIG. 8. The voltage waveform on the left side of FIG. 8 is for when only the 80V dc power source 4 is used. As shown in FIG. 8(D), at time t0, if the signal Gate becomes on, the gap voltage Vgap begins to rise as shown in FIG. 8(A). At time t1 when the gap voltage Vgap reaches the reference voltage Vref, the signal CP turns off, as shown in FIG. 8(C). At time t2 when electric discharge has started, the gap voltage Vgap starts to fall, as shown in FIG. 8(A), and current Igap flows via the work gap 12, as shown in FIG. 8(B). At time t3 when the gap voltage Vgap becomes lower than the reference voltage Vref, the signal CP becomes on, as shown in FIG. 8(C), and the signal spark also becomes on, as shown in FIG. 8(E). In this manner the increase in the electric discharge detection signal spark is delayed by the delay time td1 from time t2 to time t3. At time t4 when the on time command has elapsed from time t3, the signal Gate becomes off, as shown in FIG. 8(D), and the signal spark also becomes off, as shown in FIG. 8(E). At time t5 the gap current Igap becomes zero, as shown in FIG. 8(B).

The right side of FIG. 8 shows a typical waveform that appears in the case where a workpiece 10 having a high specific resistance is machined. In this case both dc power sources 4 and 5 are used, and a high voltage of about 150V is applied to the work gap 12. At time t6 when the signal Gate becomes on, as shown in FIG. 8(D), the gap voltage Vgap begins to rise, as shown in FIG. 8(A). At time t7 the gap voltage Vgap starts to fall. At time t8 when the gap voltage Vgap becomes lower than the reference voltage Vref, the signal spark becomes on, as shown in FIG. 8(E). However, a delay time td2 in increasing the signal spark, that is from time t7 to time t8, becomes larger than the delay time td1. With these types of delay times td1 and td2, there is lack of highly precise control of the on time, that is particularly required in microfabrication.

Patent Document 1: Japanese Patent No. 44-13195
Patent Document 2: Japanese Patent No. 3582370, FIG. 14-15
Patent Document 3: Japanese Patent No. 3396515
Patent Document 4: Japanese Laid-open Patent application No. 2001-038527
Patent Document 5: Japanese Patent No. 46-24678

SUMMARY

An aspect of the present invention is to provide an electric discharge detection method and electric discharge machining apparatus that minimize delay of an electric discharge detection signal indicating electric discharge. Another aspect of the present invention is to provide an electric discharge detection method and electric discharge machining apparatus that can accurately detect electric discharge regardless of a gap voltage waveform and machining conditions.

According to one aspect of the present invention, an electric discharge detection method, for detecting electric discharge occurring in a work gap formed between a tool electrode and a workpiece, comprises generating a gate signal, applying a voltage across the work gap to cause electric discharge during a time when the gate signal is on, detecting a gap voltage across the work gap, and receiving a gap voltage and determining that electric discharge has occurred when a fall in the gap voltage is larger than a specified voltage difference in each sampling period during the time when the gate signal is on.

Also, according to one aspect of the present invention, an electric discharge machining apparatus is provided for machining a workpiece using electric discharge. The apparatus includes a gate signal generator for generating a gate signal, a module configured to apply a voltage to a work gap formed between a tool electrode and the workpiece during a time when the gate signal is on, and a gap voltage detector for detecting a gap voltage of the work gap. The apparatus further includes an electric discharge detector including a first comparator for receiving the gap voltage and determining whether a fall in the gap voltage is larger than a specified voltage difference in each sampling period. The electric discharge detector is configured to supply an electric discharge detection signal indicating electric discharge to the gate signal generator in accordance with an output signal of the first comparator.

In one configuration, it is advantageous for the electric discharge detector to include a second comparator for receiving the gap voltage and determining a rise in the gap voltage in each sampling period, a first latch circuit, connected to the first and second comparators, for holding a newest gap voltage in each sampling period, and a second latch circuit, connected to the second comparator, for holding a newest gap voltage only when the second comparator determines that there is a rise in the gap voltage. In another configuration, it is more advantageous for the electric discharge detector to include a third comparator, connected to the second comparator and the second latch circuit, for receiving data representing the specified voltage difference.

According to one aspect of the electric discharge detection method and electric discharge machining apparatus of the present invention, it is possible to accurately detect electric discharge regardless of a gap voltage waveform and machining conditions. Accordingly, in one aspect, it is possible to control the width of a current pulse that occurs in the work gap to be as instructed. As a result, in one aspect, higher precision microfabrication becomes possible.

REFERENCE NUMERALS

1 NC device
2 gate signal generator
3 electric discharge detector
4, 5 power source
6, 7 current limiting resistor
8, 9 switching element
10 workpiece
11 tool electrode
12 work gap
13, 14 resistor
20 counter 21 comparator
22, 23 selector
24 T-flip-flop
25 AND gate
30 electric discharge detector
31 reference voltage generator
32, 33 protection resistor
34 comparator amplifier circuit
35 AND gate
36 A/D converter
37, 38 latch circuit
39 D-flip-flop
41, 42, 43 comparator
45, 47 inverter
46 binary counter
61, 63 D-flip-flop
62, 64 D-flip-flop
71, 72, 73, 74 AND gate

DETAILED DESCRIPTION

Figure 1:
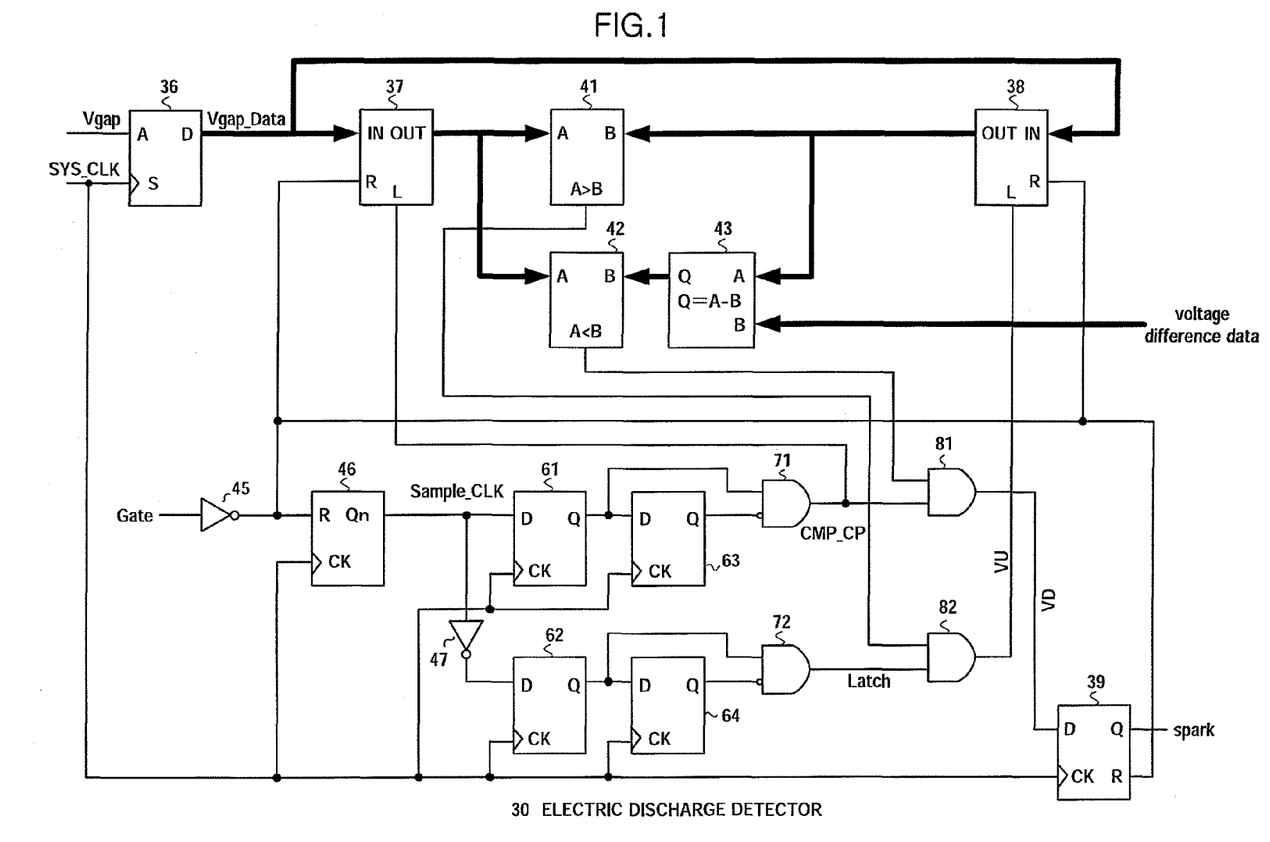
FIG. 1 is a block diagram showing an example of an electric discharge detector of the present invention.

An example of an electric discharge machining apparatus of the present invention provided with an electric discharge detector 30 will be described with reference to FIG. 1. The electric discharge machining apparatus is provided with the NC device 1, gate signal generator 2 and gap voltage detector 13, 14 in FIG. 4, but description of these parts is omitted. The gap voltage Vgap and the gate signal Gate are supplied to the electric discharge detector 30, and the electric discharge detector 30 supplies a signal spark indicating electric discharge to the gate signal generator 2. The gap voltage Vgap is supplied to an A/D converter 36. The A/D converter 36 provides digital data Vgap_Data representing the gap voltage Vgap to latch circuits 37, 38, for each input of a system clock SYS_CLK. The latch circuits 37, 38 respectively hold the newest data Vgap_Data when a pulse is supplied to their inputs L. An output terminal OUT of the latch circuit 37 is connected to respective input terminals A of comparators 41 and 42. An output terminal OUT of the latch circuit 38 is connected to input terminal B of comparator 41 and input terminal A of comparator 43.

The comparator 41 determines whether the gap voltage Vgap is rising, in each sampling period. When the gap voltage Vgap rises, an output signal A>B of the comparator 41 is in an on state. The comparator 42 determines whether a fall in the gap voltage Vgap is larger than a specified voltage difference, in each sampling period. If the fall in the gap voltage Vgap is larger than the specified voltage difference, an output signal A<B of the comparator 42 is in an on state. Data representing the specified voltage difference is supplied to an input B of the comparator 43.

A signal Gate is inverted by an inverter 45, and supplied to respective reset inputs R of the latch circuits 37, 38, a D-flip-flop 39 and a binary counter 46. The binary counter 46 receives a system clock SYS_CLK, and generates a sample clock sample_CLK for defining a sampling period. A number of sample clocks sample_CLK are generated during the time when the gate signal is on. The frequency of the sample clock sample_CLK can be set to a desired value at an output Qn of the binary counter 46. If the frequency of the system clock SYS_CLK is made 40 MHz, the frequency of the sample clock sample_CLK is 20 MHz at output Q0, 10 MHz at output Q1, 5 MHz at output Q2, and 2.5 MHz at output Q3. In one aspect, the frequency of the sample clock sample_CLK is preferably about 100 times greater than the signal Gate. When the on time is 10 μs, for example, the frequency is set to 10 MHz.

The sample clock sample_CLK is supplied in a cascade connection to D-flipflops 61 and 63. The sample clock sample_CLK is also inverted by an inverter 47 and then supplied in a cascade connection to D-flipflops 62 and 64. The system clock SYS_CLK is supplied to the D-flipflops 61, 63, 62, 64 and 39.

An output Q of the D-flipflop 61 is supplied to an input D of the D-flipflop 63 and an AND gate 71. The output Q of the D-flipflop 63 is inverted and supplied to the AND gate 71. The AND gate 71 generates a pulse CMP_CP representing rising of the sample clock sample_CLK. The pulse CMP_CP is supplied to an input L of the latch circuit 37 and to the AND gate 81. The latch circuit 37 therefore holds the newest data Vgap_Data for each rising of the sample clock sample_CLK. The output A<B of the comparator 42 is supplied to the AND gate 81. The AND gate 81 supplies an pulse VD to the input D of the D-flip-flop 39. The D-flipflop 39 supplies the signal spark to the gate signal generator 2.

An output Q of the D-flipflop 62 is supplied to an input D of the D-flipflop 64 and an AND gate 72. An output Q of the D-flipflop 64 is inverted and supplied to the AND gate 72. The AND gate 72 supplies a pulse Latch to an AND gate 82. The pulse Latch is generated in synchronism with the pulse CMP_CP, and represents falling of the sample clock sample_CLK. The output A>B of the comparator 41 is supplied to the AND gate 82. The AND gate 82 supplies a pulse VU to an input L of the latch circuit 38. The latch circuit 38 therefore holds the largest data Vgap_Data.

An example of an operation of the electric discharge detector 30 will be described with reference to FIG. 2. In one aspect, only a 90V dc power source 4 is used, and specified voltage difference data supplied to the comparator 43 is "10". At time t0, as shown in FIG. 2(A) the signal Gate is off, and output data of the latch circuits 37 and 38 are both "0". At time t1 when the signal gate has become on, the gap voltage Vgap starts to rise, as shown in FIG. 2(H), and the binary counter 46 begins counting. At time t2 when the sample clock sample_CLK has risen for the first time as shown in FIG. 2(B), the AND gate 71 supplies a first pulse CMP_CP to the latch circuit 37, as shown in FIG. 2(C). At this point in time, as shown in FIG. 2(D), the latch circuit 37 holds the newest data Vgap_Data "8". The data Vgap_Data "8" is supplied to the respective inputs A of the comparators 41 and 42. Since input B of the comparator 41 remains at "0", the output A>B of the comparator 41 becomes on.

Figure 2:
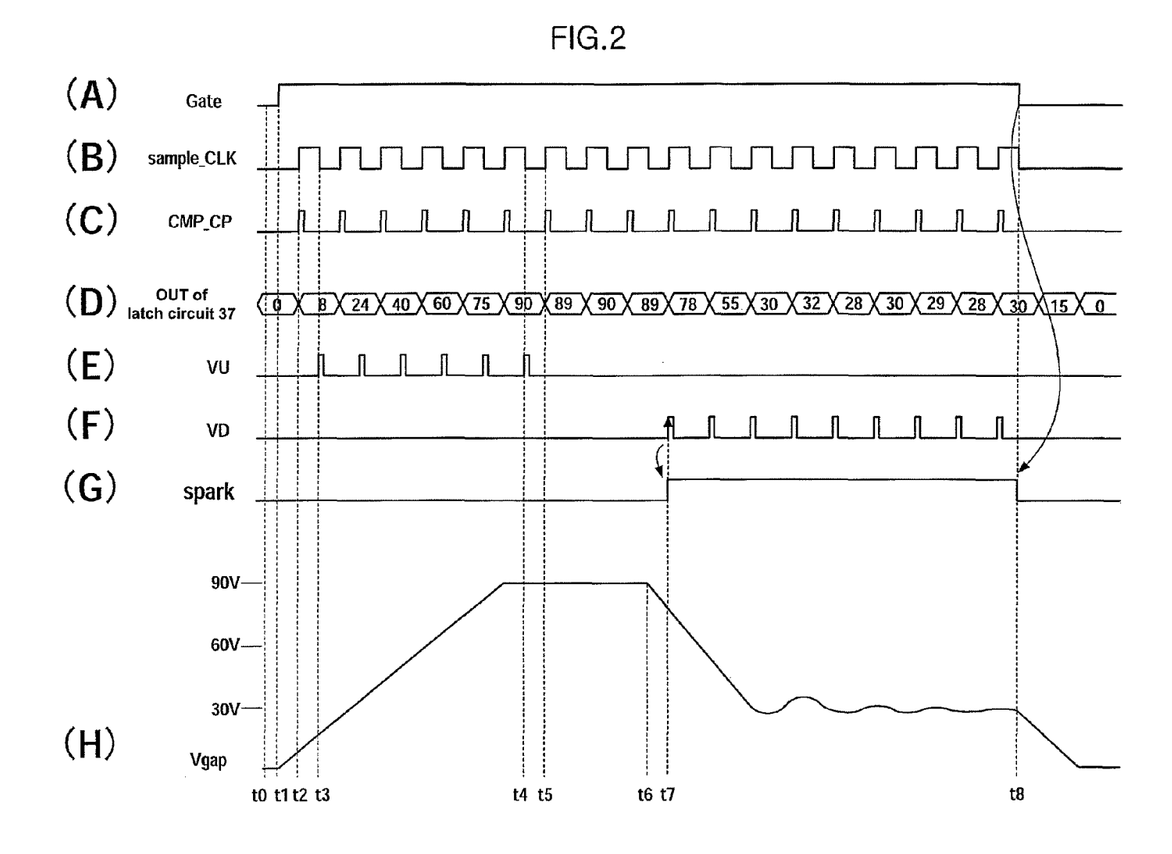
FIG. 2 is a timing chart showing an example of an operation of the electric discharge detector of FIG. 1.

At time t3 when the sample clock sample_CLK has fallen for the first time, the first pulse Latch passes through the AND gate 82 and is supplied as the pulse VU to the input L of the latch circuit 38, as shown in FIG. 2(E). The latch circuit 38 holds the data Vgap_Data "8". The gap voltage Vgap continues to rise, and pulses VU are continuously generated. At time t4, the latch circuit 38 holds data Vgap_Data "90". At time t5 the latch circuit 37 holds data Vgap_Data "89", and the output A>B of the comparator 41 becomes off. After that, input B of the comparator 41 does not exceed "90", and so the AND gate 81 no longer generates pulse VU, as shown in FIG. 2(E).

At time t6 the insulating properties of the work gap break down, and electric discharge begins. At time t7 when the first pulse CMP_CP after electric discharge has started has been generated, the latch circuit 37 holds the newest data Vgap_Data "78", as shown in FIG. 2(D). Since input B of the comparator 42 is "80", the output signal A<B of the comparator 42 becomes on. As a result, as shown in FIG. 2(F), the AND gate 81 supplies pulse VD to the D-flipflop 39. As shown in FIG. 2(G), the D-flipflop 39 turns the signal spark on in response to the pulse VD. At time t8 when the signal Gate has turned on, the D-flipflop 39 turns the signal spark off.

Figure 3:
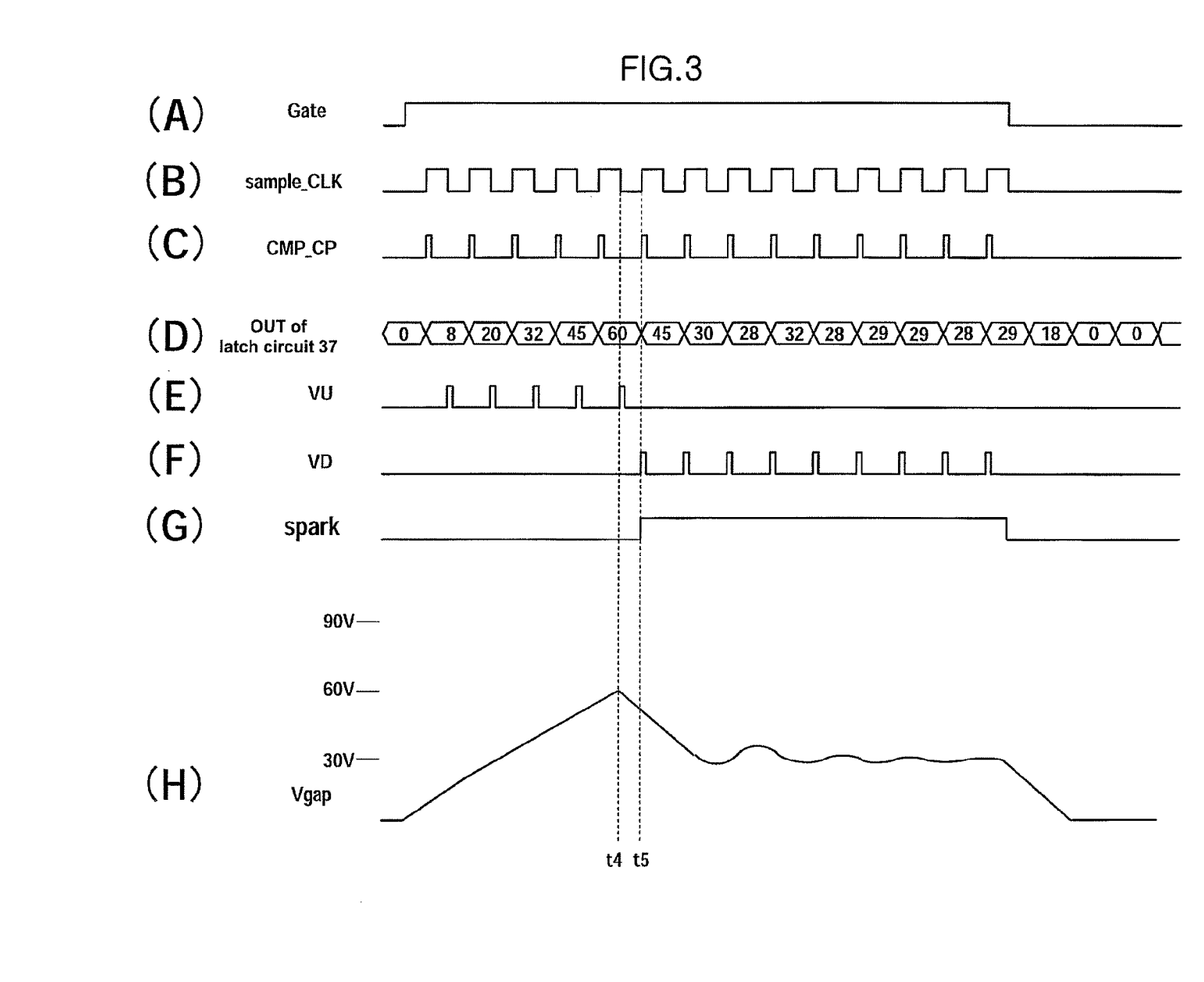
FIG. 3 is a timing chart showing another example of an operation of the electric discharge detector of FIG. 1.

Another example of an operation of the electric discharge detector 30 will be described with reference to FIG. 3. In one aspect, only a 90V dc power source 4 is used, and specified voltage difference data supplied to the comparator 43 is "10". At time t1 when electric discharge has started, the latch circuit 38 holds data Vgap_Data "60". At time t2 when the first pulse CMP_CP after electric discharge has started has been generated, the latch circuit 37 holds the newest data Vgap_Data "45", as shown in FIG. 3(D). As a result, as shown in FIG. 3(G), the D-flipflop 39 turns the signal spark on in response to the pulse VD. In this way it is possible to detect electric discharge without delay, even in the case where electric discharge has started without the gap voltage Vgap having reached 90V.

The embodiments have been selected in order to describe the principals and implementation of the present invention, and various modifications are possible taking into consideration the above teaching.

The invention claimed is:

1. An electric discharge detection method, for detecting electric discharge occurring in a work gap formed between a tool electrode and a workpiece, comprising:
   generating a gate signal;
   applying a voltage across the work gap to cause electric discharge during a time when the gate signal is on;
   detecting a gap voltage across the work gap;
   receiving a gap voltage; and
   determining that electric discharge has occurred when a fall in the gap voltage is larger than a specified voltage difference in each sampling period during the time when the gate signal is on.

2. An electric discharge machining apparatus for machining a workpiece using electric discharge, comprising:
   a gate signal generator for generating a gate signal;
   a module configured to apply a voltage to a work gap formed between a tool electrode and the workpiece during a time when the gate signal is on;
   a gap voltage detector for detecting a gap voltage of the work gap; and
   an electric discharge detector including a first comparator, the first comparator for receiving the gap voltage and determining whether a fall in the gap voltage is larger than a specified voltage difference in each sampling period, the electric discharge detector configured to supply an electric discharge detection signal indicating electric discharge to the gate signal generator in accordance with an output signal of the first comparator.

3. The electric discharge machining apparatus of claim 2, wherein the electric discharge detector further includes:
   a second comparator for receiving the gap voltage and determining a rise in the gap voltage in each sampling period;
   a first latch circuit, connected to the first and second comparators, for holding a newest gap voltage in each sampling period; and
   a second latch circuit, connected to the second comparator, for holding a newest gap voltage only when the second comparator determines that there is a rise in the gap voltage.

4. The electric discharge machining apparatus of claim 3, wherein the electric discharge detector further includes a third comparator, connected to the second comparator and the second latch circuit, the third comparator configured to receive data representing the specified voltage difference.

5. The electric discharge machining apparatus of claim 2, wherein the electric discharge detector further includes a counter for generating a sample clock having a frequency greater than a frequency of the gate signal, the sample clock for defining a sampling period.

6. The electric discharge detection method of claim 1, wherein the step of receiving a gap voltage and the step of determining are performed by a first comparator, wherein the electric discharge detection method further comprises:
   receiving, by a second comparator, the gap voltage;
   determining, by the second comparator, a rise in the gap voltage in each sampling period;
   holding, by a first latch circuit connected to the first and second comparators, a newest gap voltage in each sampling period; and
   holding, by a second latch circuit connected to the second comparator, a newest gap voltage only when the second comparator determines that there is a rise in the gap voltage.

7. The electric discharge detection method of claim 6, further comprising:
   receiving, by a third comparator connected to the second comparator and the second latch circuit, data representing the specified voltage difference.

8. The electric discharge detection method of claim 1, further comprising:
   generating, by a counter, a sample clock having a frequency greater than a frequency of the gate signal, the sample clock for defining a sampling period.

* * * * *